April 1, 1924.
C. GANSLE
POTATO ROASTER
Filed Sept. 19, 1923
1,488,593
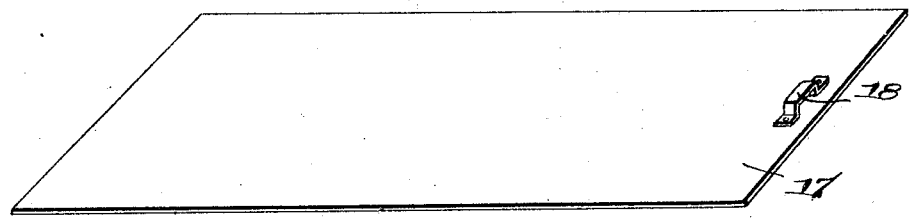
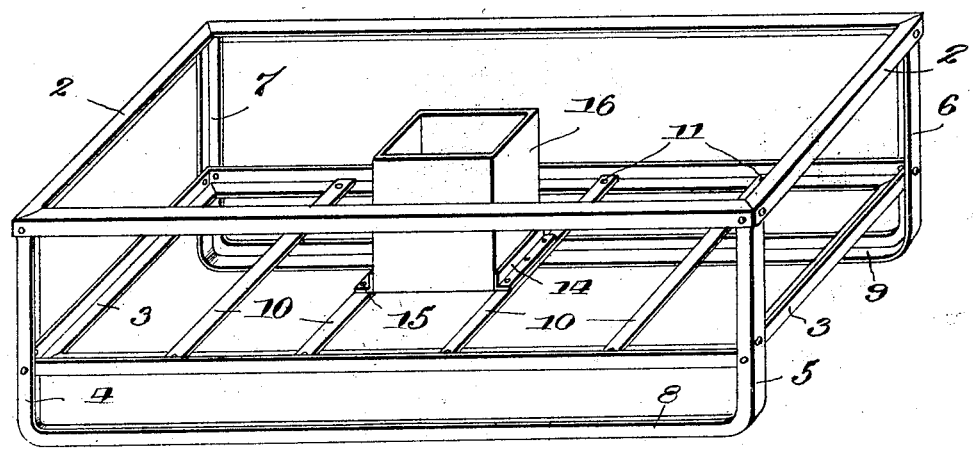
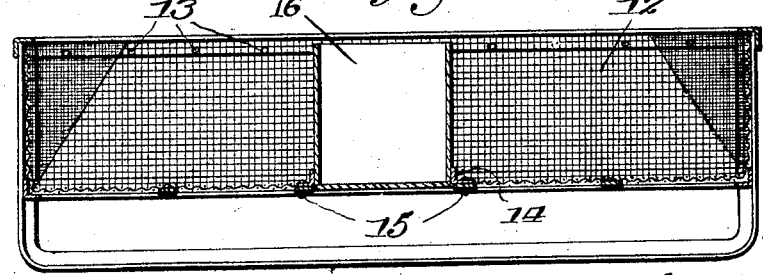
Inventor
Christian Gansle
By Edward E. Clement
Attorney Patented Apr. 1, 1924.

1,488,593

UNITED STATES PATENT OFFICE.

CHRISTIAN GANSLE, OF HUTCHINSON, KANSAS.

POTATO ROASTER.

Application filed September 19, 1923. Serial No. 663,675.

*To all whom it may concern:*

Be it known that CHRISTIAN GANSLE, citizen of the United States, residing at Hutchinson, in the county of Reno and State of Kansas, has invented certain new and useful Improvements in Potato Roasters, of which the following is a specification, reference being had therein to the accomapnying drawing.

My invention relates generally to cooking appliances and more specifically to means for roasting potatoes or the like.

The object of the invention is to provide a roaster or container for holding potatoes, or the like, while being baked or roasted in an oven, which roaster shall contain in itself, as a unitary device, the necessary means for maintaining, in conjunction with the heat supplied by the oven, favorable conditions for roasting, such as, proper supply of moisture, proper arrangement of the potatoes in relation to the heated walls of the oven, and shielding from top heat.

Another object is to provide a device of the type described which will be strong and sturdy, and simple in structure and operation.

Other objects of the invention will be apparent from a perusal of the following specification and the drawing accompanying the same.

In the drawings:

Fig. 1 is a perspective view of the device with the cover or shield removed.

Fig. 2 is a perspective view of the cover or shield.

Fig. 3 is a side view of the device, complete with sides and bottom.

Referring to the drawings in detail, and first to Fig. 1, the roaster comprises a boxlike frame 1 of angle iron having top and bottom beams 2 and 3, respectively supported on corner posts 4, 5, 6, and 7. The pairs of corner posts 4 and 5 on one side, and 6 and 7 on the other side extend down below the bottom beams and connect across the length of the frame to form supporting runners or skids 8 and 9 respectively.

Bottom straps 10, preferably of rigid strap iron, extend across the bottom of the frame from side to side where they are secured to the side members of the bottom beams 3 by rivets 11.

The bottom and sides of the box-like frame 1 are covered with a wire mesh 12 of suitable size and strength such as hail screen or the like, in the form of a lining or basket hung from the top beam member 2 to which it is secured by means of rivets 13, and resting at the bottom on the cross straps 10.

On the bottom of the frame and centrally thereof, a socket frame 14 is secured to the two central ones of the cross straps 10 and to the wire mesh by rivets 15. This socket frame receives a water vessel 16 which is held firmly therein by a tight fit of sufficient degree to prevent accidental displacement and at the same time to permit the vessel to be readily removed when so desired.

Fig. 2 shows a cover 17 which is arranged to rest upon the top frame member 2 and cover the entire roaster, the cover being provided with a handle 18 to enable it to be readily placed and removed.

In use water is placed in the vessel 16, the potatoes are put in the roaster around the water vessel and the roaster placed in a heated oven the skid supports 8 and 9 holding the bottom of the roaster up from the bottom of the oven to prevent scorching or over cooking, as well as enabling the roaster to be readily slid into and out of the oven. When there is too much heat on the top of the potatoes due to higher temperature at the top of the oven or low oven top, the cover 17 is placed on the top of the roaster for all or part of the time of roasting, to shield the contents from the top heat.

Having thus described my invention, what I claim and desire to secure in Letters Patent is:

1. A potato roaster, comprising an open three dimensional frame formed of flat top and bottom frame members connected by two pairs of corner posts, each pair extending below the bottom frame to a supporting skid, supporting straps extending across the bottom frame from side to side, a grid lining extending over the sides and bottom of the frame fixed to the top frame member and resting on the bottom frame member and supporting straps, a socket frame mounted on the bottom of the roaster and centrally thereof a water vessel mounted in said socket frame, and a cover adapted to rest upon the top frame member and cover the entire frame.

2. A potato roaster comprising an open three dimensional frame formed of a flat top and bottom frame members connected by corner posts extending downwardly below the bottom frame member, a pair of supporting skids connecting and supporting the corner posts at opposite sides of the frame, respectively, grid partition walls arranged in the sides and bottom of the frame, a grid pan and means for holding a quantity of water within the grid pan.

In testimony whereof I hereunto affix my signature.

CHRISTIAN GANSLE.